Jan. 20, 1970 H. E. SMITH 3,490,572

PRINT HEAD CARRIER DRIVE STRUCTURE EMPLOYING SAME CLUTCH FOR CARRIER RETURN AND BACKSPACE

Filed Oct. 2, 1967

7 Sheets-Sheet 1

INVENTOR.
HENRY E. SMITH

BY Samuel R. Genca
ATTORNEY

Jan. 20, 1970 H. E. SMITH 3,490,572

PRINT HEAD CARRIER DRIVE STRUCTURE EMPLOYING SAME CLUTCH FOR CARRIER RETURN AND BACKSPACE

Filed Oct. 2, 1967 7 Sheets-Sheet 2

3,490,572

PRINT HEAD CARRIER DRIVE STRUCTURE EMPLOYING SAME CLUTCH FOR CARRIER RETURN AND BACKSPACE

Henry E. Smith, Brockport, N.Y., assignor to The Singer Company, a corporation of New Jersey
Filed Oct. 2, 1967, Ser. No. 672,241
Int. Cl. B41j 19/62
U.S. Cl. 197—91 3 Claims

ABSTRACT OF THE DISCLOSURE

A print head carrier drive structure particularly useful for a serial page printer wherein a single signal responsive clutch is used for coupling a print head carrier to a source of power in response to a signal for backspacing and for returning the carrier to an initial new line printing position in one direction and rewinding a spring motor which drives the print head carrier in an opposite direction for tabulating and a character at a time printing.

The present invention relates to power operated printers which respond to data presented in code form and automatically print such data in serial character form at desirably high printing rates and, more particularly, to a print head carrier drive structure or mechanism which effects carrier, character and word spacing, backspacing and carrier return to initiate new printing.

In copending application Ser. No. 630,904, filed Apr. 14, 1967, on behalf of Edwin O. Blodgett and assigned to the same assignee as the present application, the complete details of a high speed serial character matrix page printer are given. A serial character matrix page printer has a stationary platen and a wire-matrix print head carrier supported and guided by a rail for movement longitudinally of the platen in printing a line of copy. The print head has a print wire character selection plate actuatable between wire-print and wire-selection positions by a pressure plate structure. The carrier or carrier structure includes a first spring-biased member for actuating the pressure plate structure between print and non-print positions and additionally includes a pair of spring-biased actuating members for actuating the selection plate in individual ones of two perpendicular directions to print wire character selection positions thereof. Although the present invention is suited for more general applications, it is particularly adapted for use with the printer disclosed in the cited copending application.

Wire matrix print heads have for some years been used in limited substitute for printing type mounted on type bars or the like, complexity of print head control to effect print wire character selection and print impression has generally limited their use to applications other than page printers. In particular the application of such print heads has usually been limited to printers of the form wherein the print head remains stationary and the paper stock to be printed upon is moved past the stationary print head as in interpretive printing of characters along the edge of a tabulating card or paper tape which records the characters in punch-coded form. Typical of such applications is that disclosed in the Blodgett et al. United States Patent No. 3,082,687.

Accordingly, it is an object of the present invention to provide a novel and improved print head carrier drive structure which effects carrier, character and word spacing, backspacing and carrier return to initiate new line printing for a serial printer.

It is another object of the present invention to provide a new and improved backspace mechanism for a serial printer.

It is still another object of the present invention to provide a new and improved matrix page printer wherein backspacing and return to home of a print head carrier structure are accomplished by the same clutch.

Another object of the present invention is to provide a novel serial character matrix page printer having a substantially high serial character printing rate and wherein the print head carrier structure is driven bidirectionally of a platen by an improved print head carrier drive structure.

Briefly, the present invention accomplishes the above and other objects in one embodiment of the invention in a print head carrier drive structure in a matrix page printer which includes a longitudinal platen, a carrier structure having a print head for selectively printing characters longitudinally of the platen and means for linearly movably guiding the carrier structure longitudinally of the platen. The print head carrier drive structure comprises a shaft and pulley means coupled to the shaft and the carrier structure for moving the carrier structure for selectively printing characters and tabulating in response to a rotation of the shaft in one direction and for returning the carrier structure and backspacing in the opposite direction in response to the rotation of the shaft in the opposite direction. The carrier drive structure also includes a source of power for rotating the shaft in the opposite direction and a signal responsive clutch means coupled between the source and the shaft for coupling the source to the shaft only when a carrier return signal is applied to the clutch means. The carrier structure is driven longitudinally of the platen for selectively printing characters thereon by a spring motor connected to the shaft which rewinds the spring motor each time the shaft is rotated in the opposite direction. The carrier drive structure also includes a signal responsive backspacing means coupled to the shaft for rotating the shaft in the same opposite direction to backspace the carrier structure a given character spacing in response to a backspace signal applied thereto simultaneously with a carrier return signal applied to the signal responsive clutch means. Thus, the carrier structure is returned to a new line printing position when the signal responsive clutch is energized and is backspaced when the signal responsive backspacing means and the signal responsive clutch means are simultaneously energized.

Other objects and advantages of the invention will appear as a detailed description thereof proceeds in the light of the drawings forming a part of this application and in which.

Figures 4, 5:
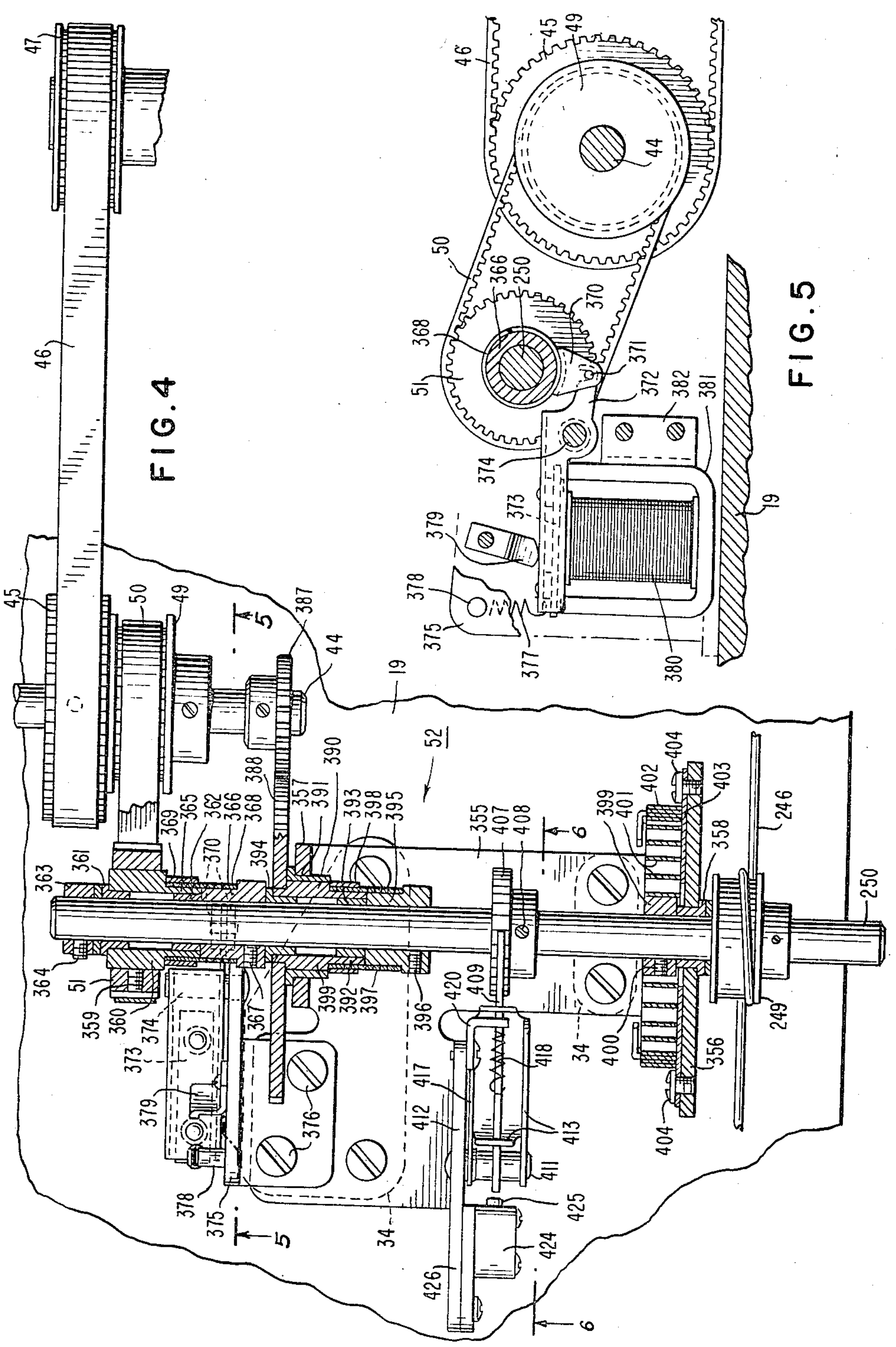
Figure 6:
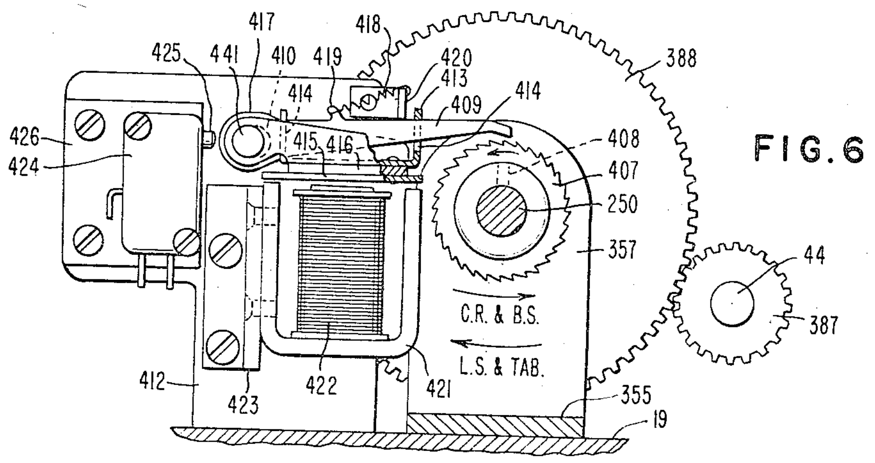
Figure 7:
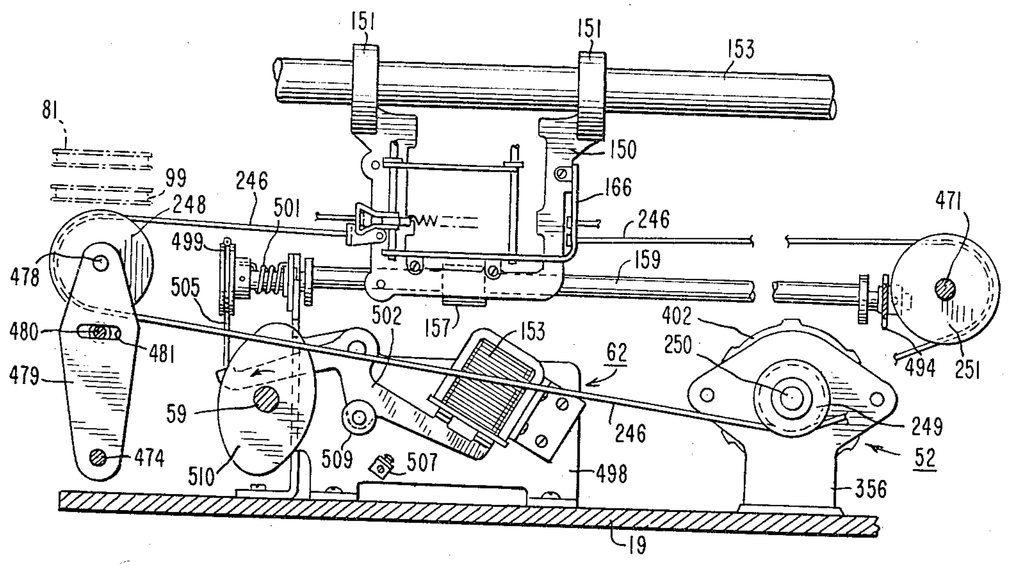
Figures 8, 8A:
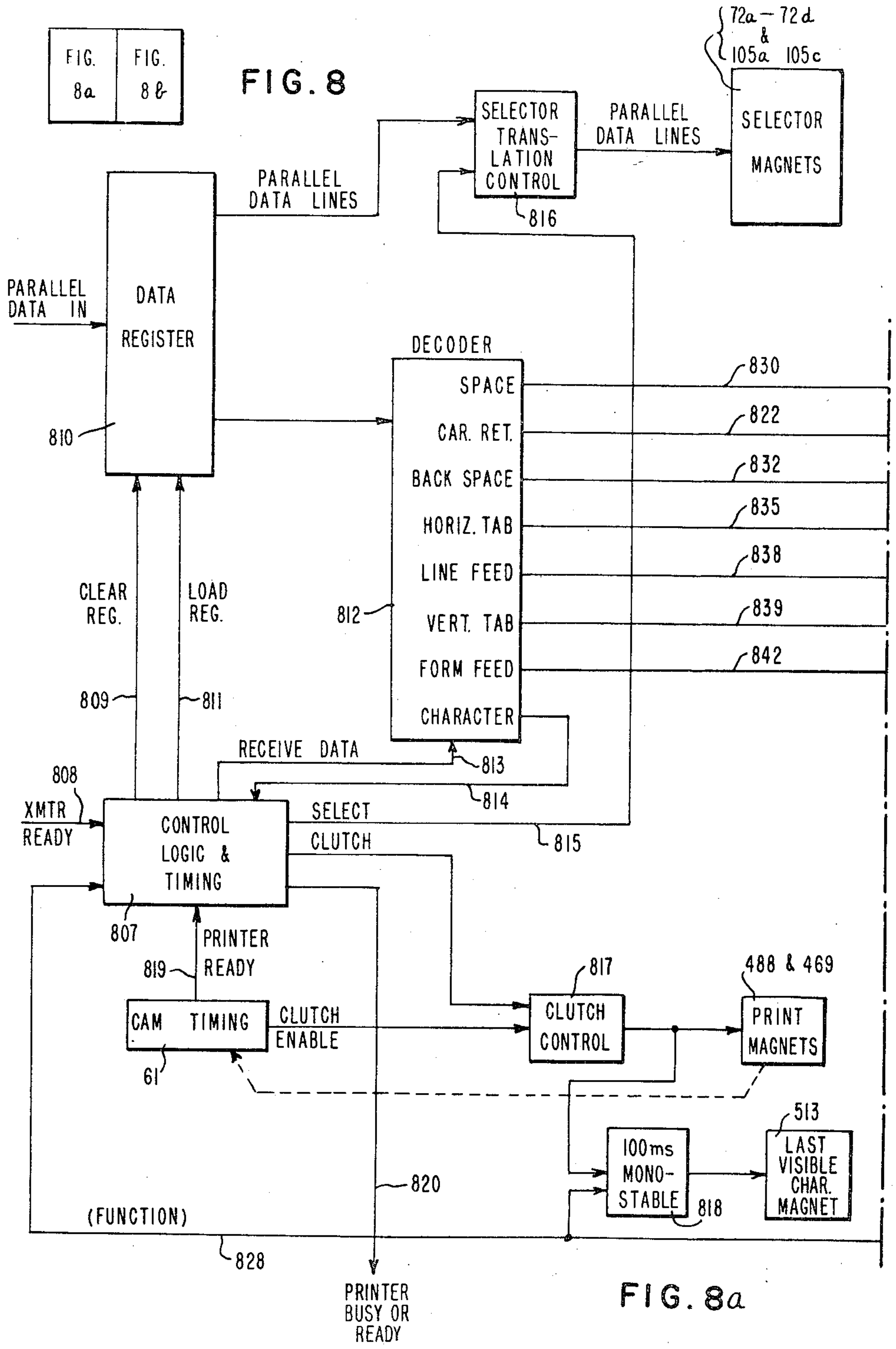
Figure 8B:
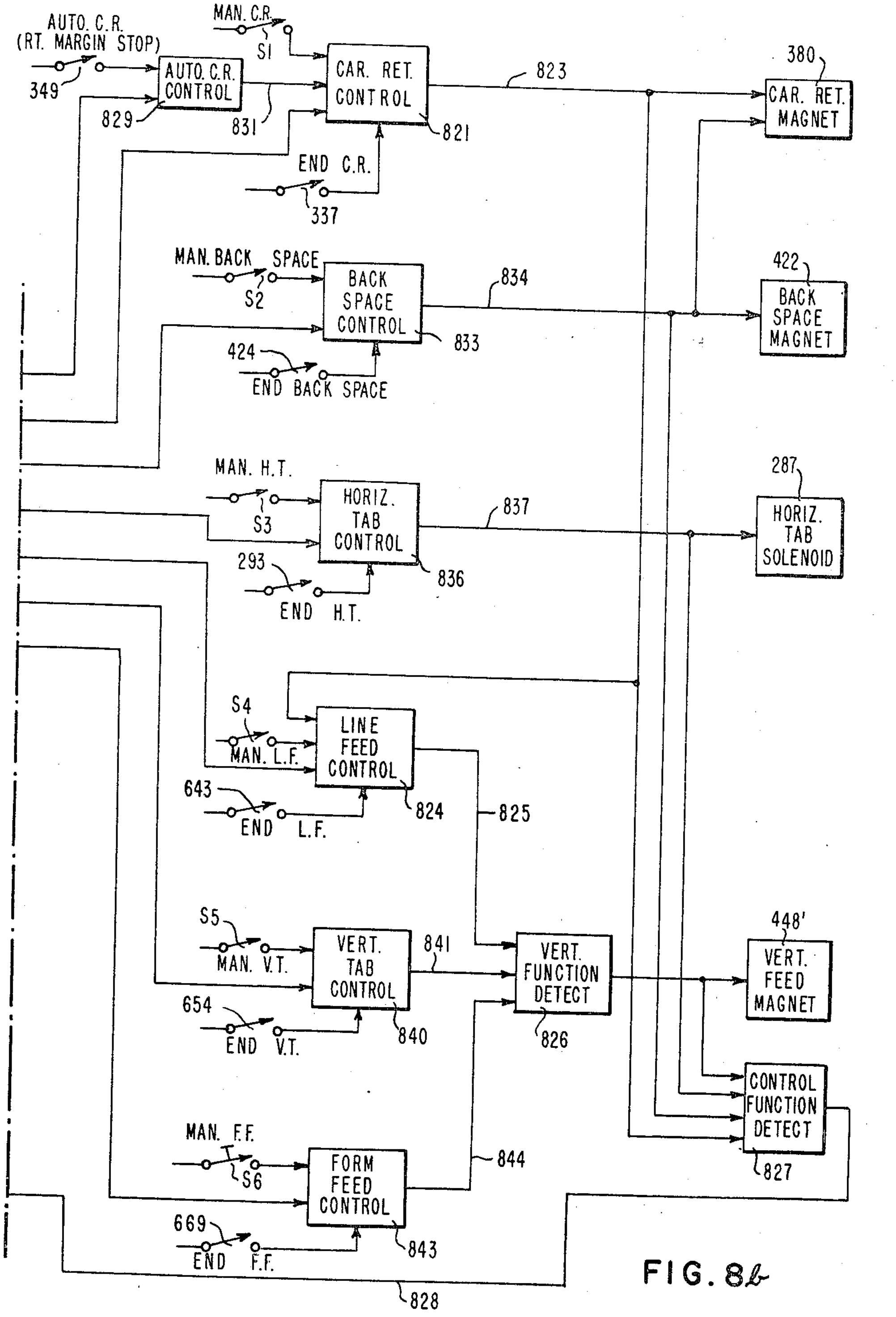

FIGS. 4, 5, and 6 show the print head carrier drive structure in accordance with the invention used for character spacing, tabulating in one direction and carrier return and backspacing in the other direction;

FIG. 7 is a view taken along line 7—7 to show the arrangement for moving the carrier in a bidirectional manner;

FIGS. 8*a* and 8*b* arranged as in FIG. 8 show in schematic form an electrical control system employed in the printer.

To aid the reader who may be interested in obtaining more details concerning the printer in which the present invention is illustrated, the above-identified drawings are identical to some of those in the cited Blodgett application. More specifically, FIGS. 1, 2, 3, 4, 5, 6, 7, 8, 8*a*, and 8*b* in the present application correspond to FIGS. 1, 3, 15, 19, 20, 21, 26, 48, 48*a* and 48*b* respectively, of the cited Blodgett application. Identical item numbers are used in the two applications for the convenience of the reader.

In the following description of a matrix page printer embodying the present invention in a particular form, and in the appended claims, reference is made to the selection and printing of characters. The term "character" is used in the present specification and claims in its generic sense as connoting signs, marks and symbols of graphic form and hence will be understood to include alphabetic symbols such as employed in the recording of a language, numerals, punctuation, and other general symbols useful in the graphic expression of information.

Figure 1:
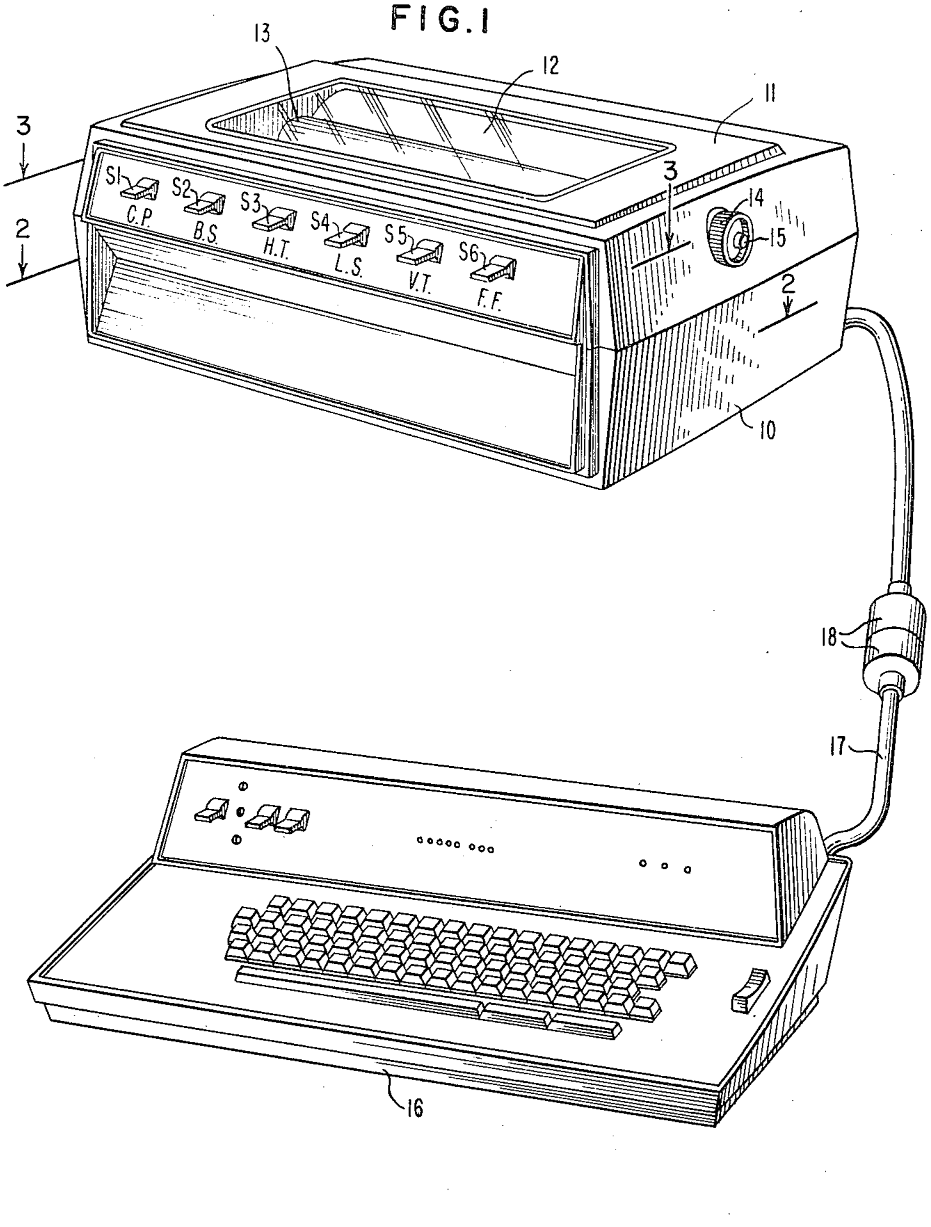
FIG. 1 illustrates the appearance of a unitary self-contained serial character matrix page printer embodying the present invention and shown by way of example as electrically controlled by a manual keyboard which conveniently is fabricated as a unit separate and apart from the printer.

Referring now more particularly to FIG. 1 of the drawings, the printer structure hereinafter described is enclosed within a housing 10 having a rearwardly-hinged cover 11 provided with a glass window 12 to permit visual observation of the progress in printing each line of copy. The cover 11 is manually raised to insert and wrap paper about a platen 13 by manual manipulation of a line spacing knob 14 and interline spacing button 15. A narrow horizontal slot (not shown) extending across the top of the rear wall of the housing permits the supply to the platen of a continuing connected series of duplicate paper forms for successive form printing operations. As will presently be explained more fully, the print operations of the printer are controlled by plural code electromagnets and functional operations of the printer are controlled by control electromagnets energized by an electrical control circuit. The code electromagnets and functional electromagnets may be electrically energized alone and in permutational code combinations by various types of code-recorded information sources, such as a punched tape reader of the type shown in the Blodgett U.S. Patent No. 2,927,158 or as shown in FIG. 1 by a manual keyboard 16 which is electrically connected to the printer by a cable 17 and electrical connector 18 and which may be of the type disclosed and claimed in the Dannatt pending application Ser. No. 522,873 (now U.S. Patent No. 3,327,828) assigned to the same assignee as the present application. The front panel of the housing 10 supports a plurality of manually operable spring-return switches S1–S6 for manual control of printer functions such as carrier return, carrier backspace, carrier horizontal tabulation, line spacing and vertical tabulation spacing of the platen 13, and form feed of the platen 13 by which after completion of printing of one form a new form is moved into printing position on the platen.

Figure 2:
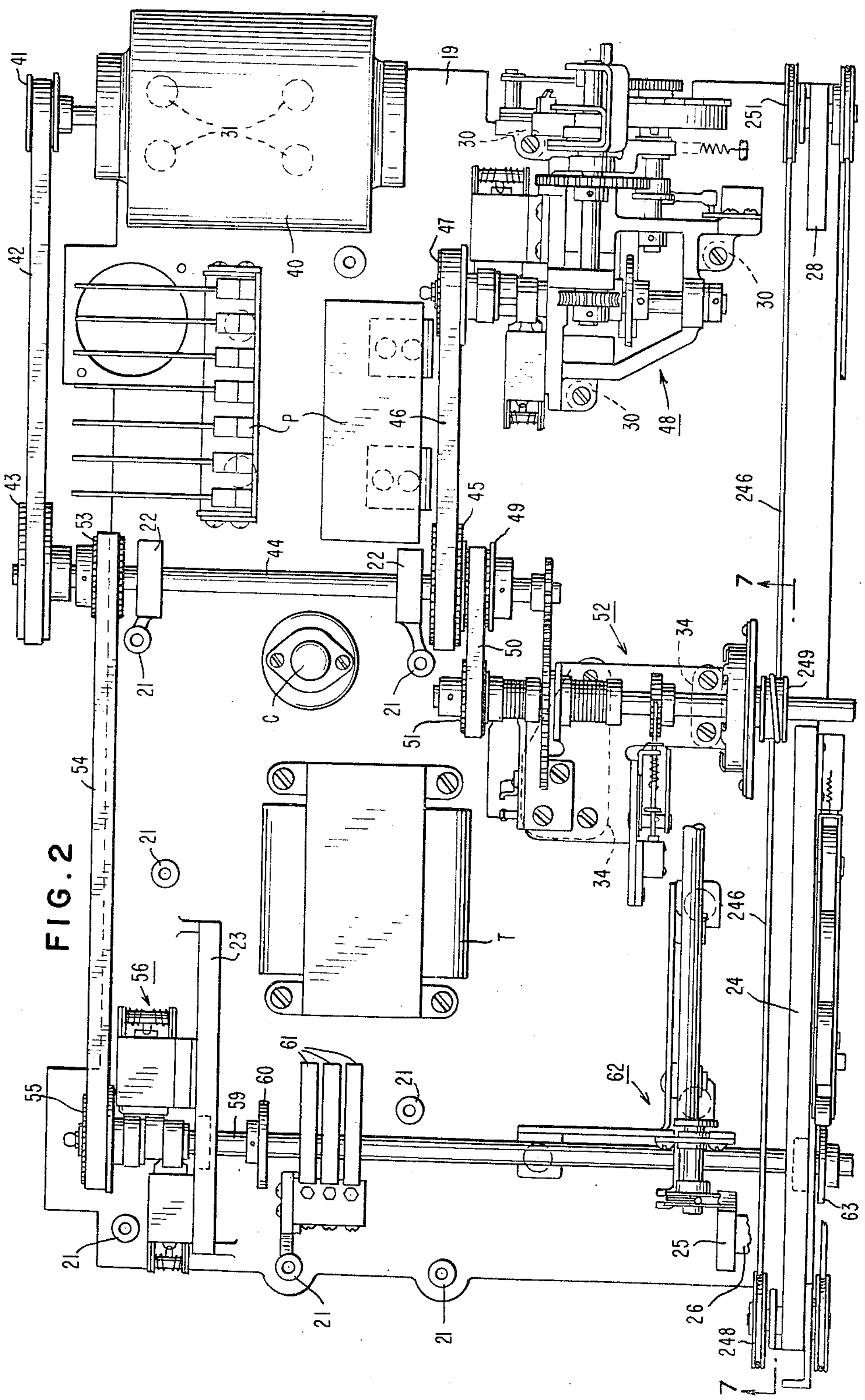
FIG. 2 is taken along line 2—2 to illustrate print head carrier drive structure in accordance with one embodiment of the invention.

FIG. 2 illustrates an assembly of printer components mounted directly upon a base casting 19 and trunnions and flanges thereof. These components include a source of drive power comprised by an electric motor 40 mechanically connected by a pulley 41 and belt 42 to a pulley 43 secured on the end of a power drive jack shaft 44 journalled by ball or roller bearings in the trunnions 22 of the baseplate. Affixed to the jack shaft 44 is a pulley 45 having peripheral transverse grooves and which is mechanically coupled by a ribbed belt 46 to a similar pulley 47 providing mechanical drive of an assembly 48 which rotationally drives the printer platen to effect line spacing, tabulation spacing, and form-feed spacing thereof. Also affixed to the jack shaft 44 is a pulley 49 having transverse peripheral grooves and which is coupled by a transversely ribbed belt 50 to a similar pulley 51 which drives a subassembly 52 operating to effect print head carrier bidirectional displacement longitudinally of the printer platen as during character and word spacing, backspacing, and carrier return operations. Additionally affixed to the jack shaft 44 is a pulley 53 having peripheral transverse grooves and which is coupled by a transversely ribbed belt 54 to a similar pulley 55 driving a 180° helical wire spring clutch 56 having clutch-control components supported upon the flange 23 of the baseplate 19. The clutch 56 is only generally here shown, but is of the type more fully disclosed and claimed in copending applications of Edwin O. Blodgett, Ser. No. 627,377 and Ser. No. 630,904, both of which are assigned to the same assignee as the present application. The clutch 56 is described more fully hereinafter and has rotational components supported upon the end of a print control jack shaft 59 journalled by roller or ball bearings in the flanges 23 and 24 of the baseplate 19 as shown. Secured to and spaced along the length of the jack shaft 59 are a cam 60 which controls certain aspects of the operation of a code selector assembly, a plurality of cams operating electrical contact assemblies 61 of the general type shown in the Blodgett U.S. Patent No. 2,927,158 (and identified therein as cam-actuated contacts CC), a cam (not visible) which actuates a last character visibility subassembly structure 62, and a cam 63 used as hereinafter described in actuating a wire print head to effect character printing. Also conveniently supported on the base casting 19 are components of an electrical control system hereinafter described and which may include by way of example an energizing transformer T, a unidirectional power supply filter condenser C, and integrated circuit panels P.

Figure 3:
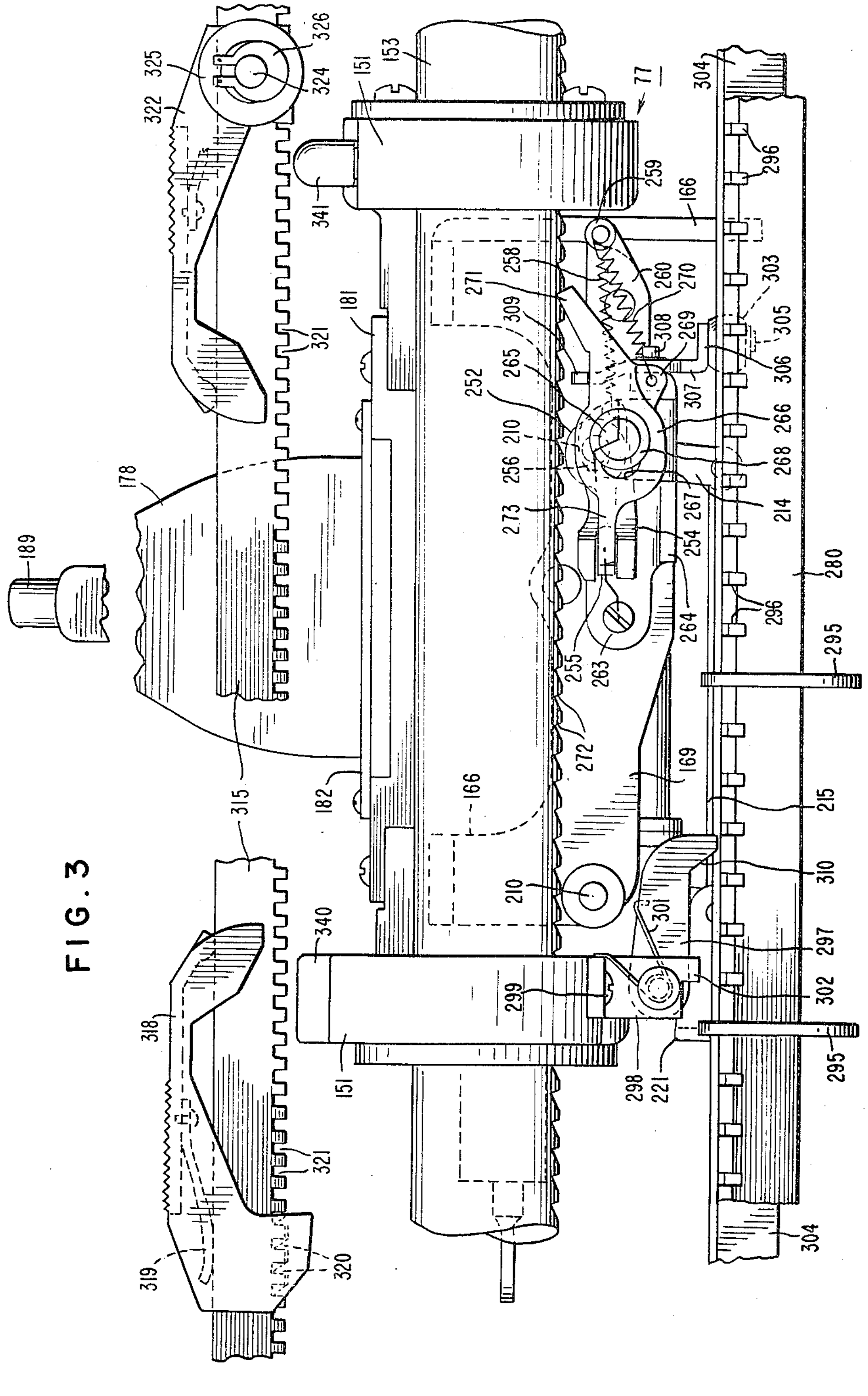
FIG. 3 illustrates a plan view of the construction of a letter escapement structure utilized in the printer of FIG. 1 for effecting letter escapement spacing between the print head carrier structure and the platen.

The construction of the print head and print head carrier 77 is illustrated in FIGS. 3 and 7. The carrier includes a rigid metal base casting 150 of rectangular O-frame configuration, providing a central rectangular aperture 149, and terminates at its upper end in integrally cast spaced flanges 151 each having an aperture 152 for slidably and pivotally supporting the base casting 150 upon a support and guide rail 153 supported by casting 19.

The print head is of the wire printer type and includes a funnel housing 178 (FIG. 3) of U-shaped transverse cross-section open at the bottom and which is affixed by brazing or solder to a plate 179 (FIG. 3) secured by machine screws 180 to a mounting plate 181. The latter is positioned in the central rectangular aperture 149 of the base casting 150 and is provided with edge flanges 182 which are secured to the base casting by machine screws 183. The plate 179 has rows and columns of equally spaced apertures (not shown) slidably to receive a plurality of print wires (not shown). The latter are guided by hollow tubes (not shown) which are generally of S-shape along their lengths and have a terminal length of the remote end of each tapered in wall thickness to converge to a compact cluster of parallelogram cross-section with the side of their distant ends ultimately engaging one another in parallel relationship. The tubes thus cause the print wires to converge to a similar cluster of parallelogram cross-section engaging one another over a short end length and projecting through a converging aperture of parallelogram cross-section provided longitudinally of a metal nose block 189 which is soldered in place within the remote open end of the funnel housing 178. The tubes have one end soldered to the plate 179 as shown and have their opposite ends soldered together as a converged cluster of tubes and also soldered or similarly affixed in like manner at the rear or non-printing end of the nose block 189.

The print head carrier 77 during printing of successive characters of a line of copy is urged by spring motor drive to move in a direction from left to right of the printer platen, and upon completing a line of copy is rapidly power driven in the opposite direction. This bidirectional drive motion of the carrier 77 is accomplished by a drive structure hereinafter described more fully but shown schematically in FIGS. 4–7 as comprised by a cable 246 which is connected by a yoke to the carrier base casting 150, extends over an idler pulley 248, is wrapped about a drive pulley 249 supported upon a drive shaft 250, extends over an idler pulley 251, and is secured to the carrier bracket 166 as shown. The spaced points at which the ends of the cable 246 are connected to the carrier structure lie on a line parallel to the axis of the rail 153 so that drive forces exerted by the cable have no tendency to twist or rock the carrier on the rail. After each print operation to effect printing of an alphanumeric character, symbol or punctuation mark, and after each word space operation effected by what would otherwise be a print operation except that the character selection plate remains both horizontally and vertically stationary at its at-rest or home position, a letter escapement movement of the carrier 77 takes place under spring motor drive of the carrier to the right. This escapement movement is accomplished by an escapement structure shown and claimed in a copending application of Henry E. Smith, Ser. No. 666,583 filed Sept. 11, 1967, and assigned to the same assignee as the present application.

As shown more clearly in FIG. 3, the escapement structure includes an arm 252 secured by a set screw upon the upper end of the left-hand one of the two shafts 210 shown in FIG. 3 and which is angularly reciprocated as earlier explained to reciprocate the pressure plate between non-print and print positions during each print operation. The arm 252 has a Z-shaped slotted end portion 254 to receive the end of an L-shaped arm 255 having an elongated slot 256 by which it is supported for longitudinal pivotal and reciprocal motion on the shaft 210 as shown more clearly in FIG. 3. The arm 255 is retained in position on the shaft 210 by a C-spring, and is biased to the right as seen in FIG. 3 by a tension spring 258 having one end anchored by a pedestal 259 mounted upon the base portion 260 of a U-shaped bracket which is provided with an aperture to receive the shaft 210 and is secured by machine screws 263 on the carrier bracket 169. The upper portion 264 of the U-shaped bracket 261 has affixed thereto a stud 265, and an escapement pawl 266 is provided with an elongated aperture 267 by which it is mounted upon the stud 265 and is secured in position thereon by a C-spring 268. As shown more clearly in FIG. 3, the pawl 266 has an apertured side projecting portion 269 anchoring one end of a tension spring 270 which is anchored at its opposite end on the pedestal 259 and by which the pawl 266 is biased to the right as seen in FIG. 3. The pawl 266 has a pawl nose portion 271 which normally engages rack teeth 272 milled longitudinally along a side length of the support rail 153, and has an arm 273 which may engage the upturned end portion of the arm 255.

The operation of the escapement structure just described will now be considered. Upon initial rotational drive of the shafts 210 to move the pressure plate and character selection plate to their print positions as earlier described, the arm 252 of the escapement structure is rotated by its supporting shaft 210 counterclockwise as seen in FIG. 3. Its slotted end portion 254 correspondingly rotates the arm 255 in a counterclockwise direction to displace the latter to one side of the pawl arm 273. As soon as the upturned end portion of the arm 255 clears the end of the pawl arm 273, the arm 255 is moved by the spring 258 longitudinally to the right as viewed in FIG. 3 to engage the end of the slot 256 with the shaft 210. This places the upturned end of the arm 255 to one side of the pawl arm 273. The pressure plate and character selection plate, having been moved to their print positions, are now moved in reverse direction toward their non-print positions of rest by reverse rotational drive of the shafts 210 as earlier explained. This causes reverse rotation of the arms 252 and 255 in clockwise direction as seen in FIG. 3, and the upturned end portion of the arm 255 now engages the side of the pawl arm 273 to pivot the pawl 266 clockwise about the stud 265 as seen in FIG. 3. As soon as the pawl nose portion 271 moves out of engagement with the rack tooth 272 which it previously engaged, the carrier 77 no longer is restrained by the pawl against spring motor displacement drive longitudinally of the rail 153. Due to the inertial mass of the carrier, it starts from rest and begins to move with small but increasingly larger velocity to effect a letter space operation. At the time this occurs, all print wires previously selected by the character selection plate for the print operation have been partially restored to their non-print positions by action of the stripper plate operated in the manner previously described. In particular, each print wire at this time is sufficiently restored toward non-print position that it no longer engages the print ribbon with the paper on the printer platen and hence there is no tendency of a print wire to cause blurring of the character pust printed upon initiation of letter space movement of the carrier 77 after its release by the pawl 266. The pawl nose portion 271, having been disengaged from the prevously engaged rack tooth 272 and having relatively small inertial mass, is now rapidly moved by the pawl spring 270 longitudinally to the right as seen in FIG. 3. As soon as the end of the pawl arm 273 clears the upturned end portion of the arm 255, the pawl spring 270 pivots the pawl 266 in a counterclockwise direction about the stud 265 to engage the pawl nose portion 271 with the next succeeding rack tooth 272. The letter escapement movement of the carrier 77 moves the stud 265 toward the right-hand end of the pawl aperture 267 as seen in FIG. 3 and the letter escapement motion of the carrier 77 is halted upon engagement of the stud 265 with the right-hand end of the pawl aperture 267. While this is occurring, the end of the pawl arm 273 re-engages the upturned end portion of the arm 255 and displaces the latter to the left against the tension of the spring 258, thus restoring the arm 255 to its initial position in readiness to initiate a further letter space operation. The pawl 266 engages the ratchet teeth 272 close to the center of gravity of the carrier 77 and thus minimizes torsional twisting of the carrier due to its mass and also minimizes any vibration tending to be developed by the escapement operation.

The carrier 77 under spring motor drive is moved in selectable tabulation steps from left to right of the printer platen by a tabulation structure shown generally in FIG. 3. The tabulation structure includes a tab rack 280 which is provided with cylindrical end portions. The end portion is supported for longitudinal displacement and rotational motion by a journal aperture provided in one forwardly projecting arm of the cast pedestal, and has a fixed radial pin 284 slidably received in a longitudinal slot provided at the end of the rotary shaft of a rotary electromagnet supported on a second arm of the cast pedestal. The end potrion of the tab rack is similarly supported for longitudinal displacement and rotational motion by an aperture provided in the cast pedestal. A collar secured on the end portion anchors one end of a helical spring having its other end anchored by the cast pedestal to bias the tab rack to the left and rotate it to the de-energized stop position of the electromagnet at which position the tab rack 280 occupies an angular position. A collar affixed to the end portion of the tab rack carries an arm which at either of two tab rack angular positions corresponding to the de-energized and energized states of the rotary electromagnet 287, operates a microswitch 293 supported on an integral laterally extending flange 294 of the cast pedestal 29.

Conventional tab stop members 295 are manually positioned on the tab rack at preselected tab positions as defined by conventional side slots 296 of the tab rack. A tab pawl member 297 is pivotally supported, as shown more clearly in FIG. 3 on a bracket 298 secured by machine screws 299 on a radially extending flangle 300 of the left-hand cast flange 151 as seen in FIG. 3, the pawl member 297 being biased by a spring 301 normally to engage a dependent stop portion 302 of the bracket 298. The de-energized state of the rotary electromagnet angularly positions the tab rack at which the pawl member 297 normally does not engage the tab stop members 295 during movement of the carrier 77 longitudinally along the rail 153.

A tab function code supplied to the printer is decoded by a decoder unit of the printer electrical control system hereinafter described and effects energization of the rotary electromagnet to rotate the tab rack 280 through a small counterclockwise angle and thus position the tab stop members 295 in engageable relation with the tab pawl member 297. At the same time, the tab code effects de-energization of an electromagnet of a last character visibility structure hereinafter described, and this structure rotates the eccentric shaft 159 to its position to pivot the carrier 77 through a small counterclockwise angle. This pivotal position of the carrier 77 and the rotated position of the tab rack 280 effected by energization of the rotary electromagnet engages a roller 303 with a track strip 304 secured along the lower surface of the tab rack 280 at shown. The roller 303 is rotationally supported by a stud 305 provided on the overturned end 360 (FIG. 3) of a lever 307 pivotally secured at 308 on the escapement bracket 261 and has an upturned end 309 which engages the rear edge of the pawl 266 to withdraw the pawl nose portion 271 from engagement with the rack teeth 272 upon pivotal motion of the lever 307 by engagement of the roller 303 with the track strip 304. This enables the carrier 77 to be spring motor driven in a direction from left to right of the printer platen until the pawl member 297 engages one of the tab stop members 295 of the tab rack 280. When such engagement occurs, the tab rack 280 is moved longitudinally to the right against the compressive force of the spring and through the arm operates the microswitch to de-energize the rotary electromagnet. Such de-energization permits the rotational bias force of the spring 290 to rotate the tab rack 280. This permits the pawl spring 270 once more to move the pawl nose portion 271 to a position where it can engage the next succeeding rack tooth 272 of the rail 153. The disengagement of the pawl member 297 with the tab stop 295 permits the carrier 77 to complete a character space to the right as controlled by the earlier described engagement of the pawl nose portion 271 with the next succeeding rack tooth 272 of the rail 153 under bias of the pawl spring 270, thus completing the tabulation operation. If the rotary electromagnet should remain energized during power driven movement of the carrier 77 from the right margin position to the left margin position of the platen, a cam surface 310 (FIG. 3) of the pawl member 297 pivots this member counterclockwise to permit passage of the tab stop members 295 past it.

The carrier 77 upon reaching a right-hand margin stop initiates and enters a printing zone within which a carrier return operation takes place. Within this zone the printer continues printing and character spacing successive alphanumeric characters, symbols and punctuation until the next word-space code is received whereupon the carrier is rapidly power driven until it engages a left-hand margin stop. This zone character of carrier return operation prevents interruption of printing before the entire last word of the line has been printed. The margin control structure is shown in plan view in FIG. 3. It includes a margin stop rack 315 having cylindrical end portions and supported for longitudinal displacement to the left and for rotational motion by journal apertures provided in the respective cast pedestals. A conventional left-hand margin stop member 318, biased by a leaf spring 319 (FIG. 3) to engage internal teeth 320 with edge slots 321 of the rack 315, may be manually depressed for setting at any desired left-hand marginal stop position. A similar right-hand margin zone-control member 322 may be manually set at any desired right-hand marginal stop-control position. One side of the stop-control member 322 has an integral boss having a stud 324 upon which a roller 325 is rotationally supported and retained in position by a C-spring 326. The stop rack 315 is biased to the right as seen in FIG. 3 by a compression spring positioned between the cast pedestal 29 and a collar secured by a set screw on the cylindrical portion, but its right-hand at-rest position is fixed by a pin projecting through and secured to the cylindrical portion and which engages a flanged bushing seated in an aperture of the cast pedestal. Longitudinal displacement of the stop rack 315 to the left from its at-rest position is permitted by compression of a washer of an elastomer material positioned between a boss on the pedestal and a collar secured on the cylindrical end portion of the stock rack. The right-hand end of the cylindrical end portion has an internally threaded axial bore receiving a flat-headed machine screw, which in the at-rest position of the stop rack 315 operatively engages a microswitch supported upon an upstanding flange of an L-shaped bracket cast on the side of the pedestal.

As illustrated in FIG. 3, the left-hand flange 151 of the carrier 77 has an integral projection 340 which during power drive movement of the carrier 77 to the left engages the left-hand margin stop 318 and displaces the stop rack 315 to the left. This displacement operates the microswitch which is included in an electrical control circuit hereinafter described and effects termination of the power drive of the carrier 77. The right-hand flange 151 of the carrier is provided with a projecting nose member 341 which, during spring motor print escapement of the carrier 77 to the right, engages the roller 325 on the right-hand margin stop-control member 322 and thereby pivots the stop rack 315 about the axis of its end portions but without longitudinal displacement of the stop rack to the right since such movement is restrained by the pin of the end cylindrical portion. Thus pivotal motion of the stop rack 315 effects corresponding rotational movement of the collar 328. A platform has an upturned side flange which is extended upwardly and is secured to the collar, and has a further upturned side flange having a downwardly extended arm which anchors one end of a tension spring. The latter has its opposite end anchored by a stud carried by the bracket and biases the platform to a position engaging the end of an adjusting screw threaded through the bracket. The position of the platform as established by the set screw places the platform in operative engagement with a microswitch supported on the bracket and also by the connection of the platform flange to the collar establishes the at-rest angular position of the marginal rack 315. When the latter is rotated by engagement of the carrier nose member 341 with the roller 325 of the right-hand margin stop-control member 322, the platform is angularly displaced to operate the microswitch which is included in an electrical control circuit hereinafter described and causes the next received word space code to effect power driven return movement of the carrier 77 to the left-hand margin position as established by the left-hand margin stop member 318.

The spring motor and power drive structure for moving the print head carrier 77 bidirectionally along the platen of the printer is comprised by the subassembly 52 illustrated in FIGS. 4 and 5. The subassembly is fabricated upon a sheet metal baseplate 355 having upturned flanges 356 and 357 and which is affixed by machine screws as shown to the bosses 34 of the baseplate 19. The flange 356 is apertured to receive a sleeve bearing 358 which rotationally journals one end of the drive shaft 250 and to which is secured the drive pulley 249 around which the drive cable 246 is wrapped as earlier mentioned in reference to the carrier drive structure schematically shown and described in relation to FIG. 3. The flange 357 of the baseplate 355 journals the other end of the shaft 250 in a manner presently to be described. The carrier power drive structure is directly driven from the printer drive motor through belts and pulleys as earlier described in connection with FIG. 2 and which include the shaft 44, the pulley 49, the belt 50, and the pulley 51. The latter is secured by a set screw 359 on a sleeve 360 which is journalled by bearing bushings 361 and 362 for rotational support upon the shaft 250 and is positionally secured on the latter by a collar 363 secured by a set screw 364 on the shaft 250. The sleeve 360 has a cylindrical sleeve end extension portion 365 which comprises a drive sleeve of a fast-acting wire spring clutch having a driven sleeve 366 secured by a machine screw 367 on the shaft 250. A helical wire spring 368 is wrapped about the sleeve portion 365 and the sleeve 366 and has one end effectively clamped to the sleeve portion 365 by a clamp sleeve 369, the other end of the spring 368 being engageable by a shoe 370 pivotally secured at 371 to an extended end 372 of an armature support structure 373 pivoted on a stud 374 of an L-shaped bracket 375 secured by machine screws 376 to the baseplate 355. A tension spring 377, having one end anchored to the armature support structure 373 and having its opposite end anchored by a stud 378 on the bracket 375, normally biases the armature support structure 373 against the end of a stop bracket 379 affixed to the bracket 375 at an angularly adjustable position such that the shoe 370 does not have significant frictional engagement with the wire spring 368. With the shoe 370 so positioned, the clutch drive sleeve 360 drives the wire spring 368 but the latter has only a sliding fit with the sleeve 366 and thus does not drive the shaft 250 at this time. An electromagnet 380, having a magnetic yoke 381 affixed by a bracket 382 to the bracket 375, may be energized to attract the armature of the armature support structure 373 and thus cause the shoe 370 to have significant frictional engagement with the spring 368 whereupon the latter wraps itself tightly about the clutch sleeve 366 and transmits rotational drive of the pulley 51 to rotational drive of the shaft 250. This drive of the shaft 250 is transmitted through the pulley 249 and cable 246 to drive the print head carrier 77 rapidly in a direction from the right-hand end toward the left-hand end of the printer platen.

When the carrier 77 performs a relatively prolonged tabulation operation under drive of the spring motor presently to be described, it is desirable for well-known reasons to limit the maximum velocity which the carrier may attain during the tabulation operation. This is accomplished in the subassembly 52 by a rotational speed limit clutch which includes a pinion gear 387 secured on the shaft 44 and meshing with a ring gear 388 having an integral hub 389 rotationally journalled by a bearing sleeve 390 seated in an aperture 391 of the baseplate flange 357. The hub 389 has an end cylindrical extension sleeve 392 comprising one component of the speed limit clutch. The hub 389 is rotationally journalled upon and supports one end of the shaft 250 by a sleeve bearing bushing 393 and a flanged bearing bushing 394. The speed limit clutch also includes a sleeve 395 which is secured by a set screw 396 on the shaft 250 and further includes a helical wire spring 397 wound over the extension sleeve 392 and the sleeve 395. The spring 397 is clamped to the extension sleeve 392 by a clamp ring 398. The spring 397 is wound in such a direction that its rotational drive by the extension sleeve 392 tends to unwrap the spring from the sleeve 395 so that the speed limit clutch has no tendency to drive the shaft 250. When the latter is driven by the spring motor during a tabulation operation, the angular velocity of the shaft 250 increases until the sleeve 395 begins to have slightly higher angular velocity than the extension sleeve 392 which is driven at constant angular velocity through the gears 387 and 388 from the shaft 44. Any velocity of the shaft 250 in even slight excess of the angular velocity of the extension sleeve 392 causes the spring 397 to wrap tightly about the sleeve 395 and extension sleeve 392 so that the shaft 250 must thereafter rotate at the same angular velocity as the extension sleeve 392 thus limiting the maximum velocity which the carrier 77 may attain during a tabulation operation.

A bushing 399 secured by a set screw 400 on the shaft 250 anchors one end of a spiral spring 401 having its opposite end secured to a cylindrical housing 402 integral with an apertured baseplate 403 secured by machine screws 404 to the baseplate flange 356. This structure comprises the spring motor drive for the carrier 77, the spring 401 being wound during return of the carrier from right to left of the printer platen under power drive effected by energization of the clutch electromagnet 380 as previously described. The wound spring 401 thereafter provides spring motor drive of the carrier 77 from the left-hand end to the right-hand end of the printer platen during printing operation.

The subassembly 52 includes a backspace mechanism, having a construction shown in FIGS. 4 and 5. This structure includes a ratchet gear 407 secured by a set screw 408 on the shaft 250. A pawl 409 has an elongated aperture 410 by which it is supported on a stud 411, for pivotal and slight longitudinal motion, provided on the side of an upturned flange 412 of the baseplate 355. A U-shaped yoke 413 having rectangular apertures 414 to receive the pawl 409 is secured with an armature 415 upon a support plate 416 having an upturned edge 417 extended and apertured for pivotal support on the stud 411. A tension spring 418, anchored between a hook projection 419 extending from the edge of the pawl 409 and an L-shaped bracket 420 secured to the flange 412, biases the pawl 409 longitudinally to the right (as seen in FIG. 6) to engage the end of the aperture 410 with the stud 411 and against the bracket 420 to hold the pawl out of engagement with the teeth of the ratchet wheel 407. The pawl 409 in turn spaces the armature 415 from a yoke 421 associated with an electromagnet 422 and supported by an L-shaped bracket 423 on the flange 412. A microswitch 424 having an operating plunger 425, adapted to be engaged and operated by the pawl 409, is secured with a space shim 426 on the flange 412. In a backspace operation, the electromagnet 422 is energized to attract its armature 415 and thus cause the yoke 413 to pivot on the stud 411 and pivot the pawl 409 into engageable relation with the teeth of the ratchet wheel 407. The electromagnet 380 (FIG. 5) of the fast-acting drive clutch earlier described is concurrently energized to drive the shaft 250 in counter clockwise direction as seen in FIG. 6 and thus initiate movement of the print head carrier 77 toward the left-hand end of the printer platen. The engagement of the pawl 409 with the teeth of the ratchet wheel 407 at this time causes the pawl to be displaced longitudinally to the left as seen in FIG. 6 until the end of the pawl engages and operates the operating plunger 425 of the microswitch 424. The operation of the latter thereupon causes an electrical control system hereinafter described concurrently to de-energize the electromagnet 422 of the backspace structure and the electromagnet 380 of the fast-acting clutch to halt drive of the shaft 250 and thus terminate the backspace operation.

The cable and pulley bidirectional spring motor drive and power drive of the carrier 77 longitudinally of the rail 153 is illustrated structurally in FIG. 7. It includes the drive pulley 249 of the drive subassembly 52 previously described in relation to FIGS. 4 and 5, and provides for rotational support of the pulley 248 on a stud 478 of an arm 479 positioned on the rear face of the base bracket 24 and pivoted on the stud 474 of the latter. The arm 479 has pivotal adjustment to provide adequate drive tension on the cable 246, and is locked in its adjusted position by a machine screw 480 which projects through a slot 481 of the arm 479 and is threaded into the base bracket 24. The pulley 251 is positioned at the rear of the pedestal 29 and is rotationally supported on the rearwardly projecting stud 471 thereof. FIG. 7 also illustrates the subassembly structure 62 for pivotally moving the print head carrier 77 about the axis of the support rail 153 between a position at which the nose block 189 of the print head is in normal line printing position shown in full lines and a position at which the nose block is dropped to enable visual inspection by an operator of the last printed character. The structure includes the shaft 159 which may be of hollow tubular configuration and is eccentrically supported at its ends by coaxially aligned opposing studs 486 and 487 formed on respective flanges 488 and 489 of respective shafts 490 and 491. The shaft 490 is rotationally supported and positionally located, by means of a flanged bushing 492 and collar 493, on an end-apertured L-shaped bracket 494 secured on the rear face of the cast pedestal. The shaft 491 is similarly rotationally supported and positionally located by a bearing structure 495 secured by machine screws 496 on the upper end of a projecting arm 497 of an L-shaped bracket 498 affixed by out-turned feet to the baseplate 19 as shown. A pulley 499 having a hub 500 is secured on the end of the shaft 491. A helical wire spring 501 having ends anchored by the bearing structure 495 and bushing 500 rotationally biases the eccentric shaft 159 at which the yoke 157 pivots the base casting 150 of the carrier 77 about the axis of the rail 153 to drop the nose block 189 of the print head. A bell crank 502 pivotally supported by a stud 503 on the bracket 498 establishes the two limits of pivotal movement of the carrier 77.

For this purpose, the bell crank 502 has a first arm 504 which is connected by a cable 505 to the pulley 499 as shown and has a second arm 506 that moves to engage a stop member 507, supported on the bracket 498, when the carrier 77 has been pivoted as last described to drop the nose block 189 a sufficient amount to enable visual inspection of the last printed character. The arm 506 has a stud 508 for rotational support of a cam follower roller 509 which, upon engagement of the arm 506 with the stop member 507, is spaced a small distance from the peripheral surface of a doublelobed cam 510 secured on the print-control shaft 59. Upon each driven half revolution of the latter, the cam 510 engages the cam roller 509 and pivots the bell crank 502 counter-clockwise as seen in FIG. 3 and against the bias force of the spring 501. This pivotal motion of the bell crank 502 positions an armature 511 carried by the end of the bell crank arm 506 in close proximity with the magnetic yoke 512 of an electromagnet 513, the yoke 512 being supported by an L-shaped bracket 514 on the bracket 498 as shown. The energized state of the electromagnet 513 attracts the armature 511 and, during further rotation of the cam 510, maintains the bell crank 502 in the pivoted position. This position of the bell crank 502 is such that the eccentrically supported shaft 159 pivots the carrier 77 to a position at which the nose block 189 of the print head is in proper line print position. Such positioning of the nose block 189 begins, under control of the cam 510, at the initiation of a half revolution of the print control shaft 59 and is completed just prior to the 115° or 295° rotational positions of the latter at which time a character print impression is made by the print wires in the manner earlier described. An electrical control system hereinafter described maintains the electromagnet 513 energized during printing of successive alphanumeric characters, symbols and punctuation but de-energizes the electromagnet 513 after a short time delay, for example, 100 milliseconds, following a character print operation accompanied by a succeeding pause longer than that required to print two successive characters. Such de-energization of the electromagnet 513 permits the helical wire spring 501 relatively rapidly to pivot the bell crank arm 506 against the stop member 507 and thereby quickly drop the nose block 189 of the print head for visual inspection of all printed characters including the last one printed.

The electrical control system of the printer is schematically represented in block diagram form in FIGS. 8*a* and 8*b* arranged as in FIG. 8. The control system includes a control logic and timing unit 807 which is controlled by a signal applied to an input circuit 808 indicative of the readiness of the data source to supply an item of data information such as an alphanumeric character, symbol, or punctuation mark for printing or a functional control information item. Upon receipt of such signal, the unit 807 operates through the control circuit 809 to clear an information item previously supplied in binary coded form and by parallel-presented binary code bits from the data source and stored in binary coded form in a data register 810. Having cleared register 810, the unit 807 through a control circuit 811 causes the data register 810 to receive and store a further information item supplied by the data source for printing or functional control. The information item stored in the register 810 is thereupon supplied in binary coded form and by parallel-presented binary code bits to a decoder unit 812, which is briefly controlled by the unit 807 through a control circuit 813 to receive and decode the item to ascertain whether the stored item is a character to be printed or a functional control information item.

If the information item stored in the register 810 is a character to be printed, the decoder 812 supplies a signal through a control circuit 814 to the control unit 807 which thereupon through a control circuit 815 causes a selector translator control unit 816 (which for example may be comprised by individual code-bit input AND gates, all conditioned by the control circuit 814, and individual cathode followers) concurrently to translate the individual binary code bits representing the information item stored in the register 810 to corresponding energizations of individual ones of the character selector magnets **72*a*–72*d* and 105*a*–105*c* of the code selector assembly. The control unit 807 under control of the control circuit 814 also controls a clutch-control unit 817 of AND gate form to energize the print clutch control magnet 448 and the print head pressure plate actuation magnet 469 for a short interval, such interval being defined by energization supplied to the unit 817 by one of the cam-actuated electrical contacts 61 each time the printer has completed one print cycle and is ready to initiate a further print cycle. The printer prints successive characters at less than 100 millisecond intervals, and the energization supplied to the print electromagnets 448 and 469 is also supplied as a control potential pulse to control a monostable multivibrator 818. If the latter is OFF at this time, the control potential pulse turns it ON and it remains ON for 100 milliseconds; if the multivibrator 818 is ON at this time, the control potential pulse effects recharging of the multivibrator cycle-control time constant network to cause the multivibrator to start a new 100 millisecond time cycle. The ON state of the multivibrator 818 effects energization of the electromagnet 513 of the last character visibility structure to maintain the print head elevated to character print position as previously described. Should a pause in the printing of successive characters permit the multivibrator 818 to complete its cycle and turn OFF, the resulting de-energization of the electromagnet 513 drops the print head to permit visual inspection of all printed characters. As a print cycle progresses after energization of the print electromagnets as just described, another of the cam-actuated electrical contacts 61 operates through a control circuit 819 and causes the control unit 807 to supply a signal to an output circuit 820 informing the data source that the printer is executing a print cycle. At the end of the printing operation, a further one of the cam-actuated electrical contacts 61 causes the control unit 807 to supply to the out-output circuit 820** a signal indicating to the data source that the printer is ready to accept a further information item.

If the decoder 812 ascertains that the information item stored in the register 810 is a functional control information item, the control unit 807 and the control unit 817 are not then controlled through the control circuit 814 and the print electromagnets 448 and 469 are not energized.

Should the decoder 812 ascertain that the stored information item of the register 810 is a carrier return information item a carrier return control unit 281 through trol circuit 822 of the decoder 812 to turn ON a bistable multivibrator included in the unit 821. The ON state of the multivibrator effects energization of an output circuit 823, as by use of a cathode follower stage, which energizes the carrier return clutch electromagnet 380 and initiates a carrier return operation. The energization of the output circuit 823 is also supplied to a line feed control unit 824 to turn ON a multivibrator included therein and thereby effect energization, as by use of a cathode follower stage, of the vertical feed clutch electromagnet 448′ through an output circuit 825 of the unit 827 and through a vertical function detector unit 826 of the OR form. The line feed operation is terminated in a manner hereinafter described in connection with the line feed functional operation. The energization of the output circuit 823 of the unit 821 is also supplied to a control function detector unit 827 of the OR form and having an output circuit 828 which is thereupon energized to turn OFF the monostable multivibrator 818, and thus de-energize the last visible character electromagnet 513 to drop the nose of the print head for visual inspection of all characters last printed, and so to control the control unit 807 as to supply a signal to the output circuit 820 indicating to the data source that the printer is not ready to accept a further information item. When the carrier has returned to the left-hand margin to close the contacts of the microswitch 337 as earlier described, the multivibrator of the control unit 821 is turned OFF to deenergize the output circuit 823 and carrier return clutch electromagnet 380 and thereby terminate the carrier return operation. When this occurs, and upon completion of the line feed operation under control of the unit 824, the platen has been rotated one line space by the previous energization of the vertical feed clutch electromagnet 448′ and the output circuit 820 now supplies a signal to the data source indicating that the printer is ready to accept a further information item.

The carrier return operation just described may also be manually initiated for any prevailing position of the print head carrier by brief manual actuation of a panel switch S1 (FIG. 1) to close its contacts and thereby, through an OR input circuit of the control unit 821, cause the latter to turn ON the multivibrator thereof with resultant energization of the output circuit 823 of this unit.

An automatic carrier return zone of operation is established when the right-hand margin-control microswitch electrical contacts 349 are briefly closed in the manner earlier described. The closure of these contacts turns ON a bistable multivibrator included in an automatic carrier control unit 829 to condition one input leg of a double-leg AND gate of this unit. The next word space code causes the decoder unit 812 to energize an output circuit 830, and this energization conditions the second input leg of the AND gate of the unit 829 and thereby causes the output circuit of the AND gate to energize an output circuit 831 of this unit. The energization of the output circuit 831 is translated through an OR input circuit of the unit 821 to turn ON the multivibrator of the unit 821. The carrier return operation is thereupon initiated and completed in the same manner as described just above in relation to the energization of the decoder output circuit 822 by a carrier return function code.

Should the decoder 812 ascertain that the information item stored in the register 810 is a backspace information item, an output circuit 832 of the decoder 812 conditions an OR input circuit of a backspace control unit 833 to turn ON a bistable multivibrator included therein. This effects, as by use of a cathode follower stage, energization of an output circuit 834 of this unit. The energization of the output circuit 834 concurrently energizes the carrier return clutch electromagnet 380 and the backspace electromagnet 422 to initiate a backspace operation. When the carrier has moved to the left one character space, the electrical contacts of the microswitch 424 close to turn the multivibrator of the unit 833 OFF and thus de-energize the output circuit 834 with resultant de-energizations of the electromagnets 380 and 422. Upon energization of the output circuit 834 of the control unit 833, the control function detector 827 through its output circuit 828 turns OFF the monostable multivibrator 818 for last character visibility, and during the period of energization of the output circuit 834 and for a short delay interval thereafter causes the output circuit 820 to indicate to the data source that the printer is not ready to accept a further information item. The backspace operation may also be initiated by brief manual actuation of a panel switch S2 to close its contacts and thereby effect through an OR input circuit of the unit 833 turn ON of the multivibrator of this unit with resultant energization of its output circuit 834.

When the decoder 812 ascertains that the information item in the register 810 is a horizontal tabulation information item, the decoder unit 812 energizes an output circuit 835 to cause an OR input circuit of a horizontal tabulation control unit 836 to turn ON a bistable multivibrator included in this unit and thereby effect energization (as by use of a cathode follower stage) of an output circuit 837. Energization of the latter circuit energizes the horizontal tabulation solenoid electromagnet 287 to initiate a horizontal tabulation operation, and through the detector unit 827 effects immediate turn OFF of the monostable multivibrator 818 and the supply of a signal through the output circuit 820 informing the data source that the printer is not ready to accept a further information item. When the carrier strikes a tab stop to close the electrical contacts of the microswitch 293 as earlier described, the multivibrator of the control unit 836 is turned OFF to de-energize the output circuit 837 and thereby supply a signal through the output circuit 820 to the data source that the printer is ready to accept a further information item. The tabulation operation just described may also be manually initiated by brief manual operation of a panel switch S3 to close its contacts and through an OR input circuit of the unit 836 effect turn ON of the multivibrator of this unit with resultant energization of the output circuit 837.

When the decoder unit 812 ascertains that the information item stored in register 810 is a line feed information item, the decoder unit 812 energizes an output circuit 838. This energization applied through an OR input circuit of the line feed control unit 824 turns ON the multivibrator of this unit, and the latter thereupon energizes the vertical feed clutch electromagnet 448′ through the vertical function detector 826. The function detector 827 is concurrently energized and through its output circuit 828 turns OFF the monostable multivibrator 818 and supplies a signal through the output circuit 820 to the data source indicating that the printer is not ready to accept a further information item. After the line feed operation has progressed to 50% of completion, a lobe of the cam 609 causes the line feed control electrical contacts 643 to close. Upon closing, these contacts cause a differentiated electrical pulse to be supplied to the turn-OFF circuit of the multivibrator of the control unit 824 to turn the multivibrator OFF and thus de-energize the vertical feed clutch electromagnet 448′. The clutch 56′ continues drive of the structure 48 for an additional 45° of its driven shaft 598 and thus completes the line space operation. When this occurs, the cam 609 has once more operated the electrical contacts 643 to open contact position in readiness for another line feed operation. While the line feed operation is continuing to completion after the multivibrator has been turned OFF, and thus has removed energization from the output circuit 828 of the detector unit 827, the control unit 807 operates for a preselected delay interval to provide a continuing signal to the output circuit 820 informing the data source that the printer is yet busy. At the end of the delay interval, the control unit 807 supplies a signal through the output circuit 820 informing the data source that the printer is now ready to receive a further information item. A line feed operation may also be initiated by brief manual operation of the panel switch S4 to close its contacts and through an OR input circuit of the unit 824 similarly turn ON the multivibrator of this unit.

A vertical tabulation information item stored by the register 810 causes the decoder 812 to energize an output circuit 839 and an OR input circuit of a vertical tabulation control unit 840 effects turn ON of a bistable multivibrator included in this unit. The ON state of the multivibrator effects energization, as by use of a cathode follower stage, of an output circuit 841 of the unit 840 and thereby supplies energization through the detector unit 826 to energize the vertical feed clutch electromagnet 448' and initiate a vertical feed operation. Also and as previously described, such energization effects turn OFF of the monostable multivibrator 818 and the supply of a signal through the output circuit 820 indicative to the data source that the printer is busy and accordingly not ready to accept a further information item. The vertical tabulation operation is terminated when the vertical tabulation electrical contacts 654 close to cause a differentiated electrical pulse to be supplied to a turn-OFF circuit of the multivibrator of the unit 840 and thus by turn OFF of the multivibrator de-energize the output circuit 841 and the vertical feed clutch electromagnet 448'. As before, the control unit 807 operates for a preselected interval to provide a continuing busy signal to the output circuit 820 until the vertical tabulation operation is completed and thereafter supplies a signal through the output circuit 820 informing the data source that the printer is ready to accept a further information item. The vertical tab operation just described may also be initiated by brief manual operation of a panel switch S5 to close its contacts and through an OR input circuit of the unit 840 effect similar turn ON of the multivibrator of this unit.

A form feed information item stored in the register 810 causes the decoder 812 to energize an output circuit 842 and thereby cause an OR input circuit of a form feed control unit 843 to turn ON a bistable multivibrator included therein. The latter through an output circuit 844 and the detector 826 effects energization of the vertical feed clutch electromagnet 448' and initiates a vertical feed operation. This energization likewise causes the detector 827 through its output circuit 828 to effect immediate turn OFF of the monostable multivibrator 818 and the supply of a signal through the output circuit 820 informing the data source that the printer is not ready to accept a further information item. The form feed operation is completed when the form feed electrical contacts 669 close to cause a differentiated electrical turn OFF pulse to turn OFF the multivibrator of the unit 843 and thus de-energize the vertical feed clutch electromagnet 448'. There is concurrent supply of a signal by the control unit 807 to the output circuit 820 informing the data source that the printer is busy until the form feed operation has been completed, and thereafter the supply of a signal indicating that the printer is ready to accept a further information item. The form feed operation may also be initiated by brief manual operation of the panel switch S6 to close its contacts and through an OR input circuit of the unit 843 similarly turn ON the multivibrator of this unit.

What is claimed is:

1. In a printer including a platen having a longitudinal axis and a print head carrier structure movable bidirectionally of said platen substantially parallel thereto for printing thereat, a carrier drive structure comprising:

(a) a frame;

(b) a shaft rotatably mounted on said frame;

(c) pulley means coupled to said shaft and said carrier structure for moving said structure in a letter spacing direction in response to a rotation of said shaft in one direction and for moving said structure in a carrier return direction in response to a rotation of said shaft in the opposite direction;

(d) power means for rotating said shaft in said opposite direction when coupled thereto;

(e) signal responsive clutching means fixed to one end of said shaft for coupling said power means to said shaft in response to a first signal applied thereto so that said carrier structure moves in said carrier return direction in response to said first signal;

(f) spring motor means coupled to said shaft at the opposite end thereof for yieldingly biasing rotation of said shaft in said one direction in response to said rotation of said shaft in said opposite direction so that said carrier structure is yieldingly biased in said letter spacing direction;

(g) escapement means connected to said carrier structure and said pulley means for escaping said structure a character spacing at a time in said letter spacing direction in response to a printing operation; and (h) back spacing means disposed at a point along the length of said shaft in cooperative relationship with said clutching means for back spacing said carrier structure one character space in said carrier return direction in response to the simultaneous application of a second signal to said back spacing means and said first signal to said clutching means, (i) said back spacing means having a ratchet fixed on said shaft at said point and a pawl member coacting with said ratchet for terminating rotation of said shaft and said first and second signals when said carrier structure has completed said back spacing in said carrier return direction.

2. The invention defined in claim 1 wherein said signal responsive clutching means includes a first solenoid which is energized in response to said first signal and said signal responsive backspacing means includes a second solenoid connected in cooperative electrical relationship with said first solenoid to backspace said carrier structure in response to a second signal applied to said second solenoid and said first signal to said first solenoid.

3. The invention defined in claim 2 wherein said backspacing means includes a switch positioned in cooperative relationship with said pawl for de-energizing said first and second solenoids when said carrier structure completes said backspacing operation.

References Cited

UNITED STATES PATENTS

| | | | |
|---|---|---|---|
| 2,093,545 | 9/1937 | Bryce et al. | 197—91 |
| 2,393,441 | 1/1946 | Yaeger | 197—66 |
| 2,701,045 | 2/1955 | Madsen | 197—91 |
| 2,879,876 | 3/1959 | Palmer | 197—16 |
| 2,902,133 | 9/1959 | Walton et al. | 197—66 |
| 2,909,935 | 10/1959 | Dodge | 197—64 |
| 3,126,998 | 3/1964 | Palmer | 197—82 |
| 3,276,561 | 10/1966 | Berg | 197—65 |
| 3,353,646 | 11/1967 | Young | 197—65 XR |
| 3,366,215 | 1/1968 | Hosey et al. | 197—66 XR |

EDGAR S. BURR, Primary Examiner

U.S. Cl. X.R.

197—65, 66